US008721896B2

(12) United States Patent
Sortwell

(10) Patent No.: US 8,721,896 B2
(45) Date of Patent: May 13, 2014

(54) METHOD FOR DISPERSING AND AGGREGATING COMPONENTS OF MINERAL SLURRIES AND LOW MOLECULAR WEIGHT MULTIVALENT POLYMERS FOR MINERAL AGGREGATION

(71) Applicant: Sortwell & Co., St. Simons Island, GA (US)

(72) Inventor: Edwin T. Sortwell, St. Simons Island, GA (US)

(73) Assignee: Sortwell & Co., St. Simons Island, GA (US)

( * ) Notice: Subject to any disclaimer, the term of this patent is extended or adjusted under 35 U.S.C. 154(b) by 0 days.

(21) Appl. No.: 13/748,486

(22) Filed: Jan. 23, 2013

(65) Prior Publication Data
US 2013/0190431 A1 Jul. 25, 2013

Related U.S. Application Data

(63) Continuation of application No. PCT/US2013/022459, filed on Jan. 22, 2013.

(60) Provisional application No. 61/590,489, filed on Jan. 25, 2012.

(51) Int. Cl.
C02F 1/56 (2006.01)

(52) U.S. Cl.
USPC .......................................... 210/734; 210/733

(58) Field of Classification Search
CPC ........ C02F 1/56; C02F 2001/52; C08F 20/00; C08F 20/04; C08F 20/06; C08F 20/56
USPC ................................................ 210/733, 734
See application file for complete search history.

(56) References Cited

U.S. PATENT DOCUMENTS

| | | | |
|---|---|---|---|
| 1,161,200 A | 11/1915 | de Brunn |
| 1,793,670 A | 2/1931 | Borrowman |
| 2,004,257 A | 6/1935 | Tschirner |
| 2,290,473 A | 7/1942 | Kalmar et al. |
| 2,581,186 A | 1/1952 | Green |
| 2,621,859 A | 12/1952 | Phillips |
| 2,678,168 A | 5/1954 | Phillips |
| 2,757,085 A | 7/1956 | Paquin |
| 2,902,399 A | 9/1959 | Paquin |
| 2,924,549 A | 2/1960 | Klein et al. |
| 3,080,264 A | 3/1963 | Zimmie et al. |
| 3,085,916 A | 4/1963 | Zimmie et al. |
| 3,090,567 A | 5/1963 | Schafer et al. |
| 3,365,520 A | 1/1968 | Foster et al. |
| 3,405,874 A | 10/1968 | Brizon |
| 3,487,003 A | 12/1969 | Baillie et al. |
| 3,488,720 A | 1/1970 | Nagy et al. |
| 3,502,575 A | 3/1970 | Hepp et al. |
| 3,642,501 A | 2/1972 | Minieri |
| 3,677,476 A | 7/1972 | Harned |
| 3,723,308 A | 3/1973 | Breck |
| 3,804,656 A | 4/1974 | Kaliski et al. |
| 3,816,080 A | 6/1974 | Bomford et al. |
| 3,835,046 A | 9/1974 | Restaino |
| 3,917,538 A | 11/1975 | Rosensweig |
| 3,995,817 A | 12/1976 | Brociner |
| 4,032,466 A | 6/1977 | Otrhalek et al. |
| 4,065,544 A | 12/1977 | Hamling et al. |
| 4,175,117 A | 11/1979 | Hill |
| 4,180,508 A | 12/1979 | Becker et al. |
| 4,201,669 A | 5/1980 | Becker et al. |
| 4,213,874 A | 7/1980 | Williams et al. |
| 4,305,781 A | 12/1981 | Langley et al. |
| 4,332,354 A | 6/1982 | deMonterey et al. |
| 4,343,706 A | 8/1982 | Etzel et al. |
| 4,348,369 A | 9/1982 | Hinchey et al. |
| 4,385,961 A | 5/1983 | Svending et al. |
| 4,388,150 A | 6/1983 | Sunden et al. |
| 4,405,483 A | 9/1983 | Kuzel et al. |
| 4,425,238 A | 1/1984 | Degen et al. |
| 4,486,314 A | 12/1984 | Koppelmann et al. |
| 4,529,794 A | 7/1985 | Sortwell et al. |
| 4,578,150 A | 3/1986 | Hou |
| 4,581,153 A | 4/1986 | Trabitzsch et al. |
| 4,624,418 A | 11/1986 | Szkaradek |
| 4,627,959 A | 12/1986 | Gilman et al. |
| 4,643,801 A | 2/1987 | Johnson |
| 4,647,304 A | 3/1987 | Petkovic-Luton et al. |
| 4,651,935 A | 3/1987 | Samosky et al. |

(Continued)

FOREIGN PATENT DOCUMENTS

| | | |
|---|---|---|
| CA | 1 311 571 C | 12/1992 |
| CA | 2 085 188 A1 | 6/1993 |

(Continued)

OTHER PUBLICATIONS

Examination Report from Canadian patent application No. CA 2,803,025, issued May 2, 2013.
International Search Report and Written Opinion, corresponding International Application No. PCT/US13/22459, mailing date Apr. 1, 2013.
Canadian Notice of Allowance for Application No. 2,667,933, dated Jul. 20, 2011.
Canadian Office Action for Application No. 2,667,933, dated Sep. 27, 2010.
Colloidal Silica-Concentrated Sols. (Date Unknown), pp. 407-410.
Cotton, F. Alberto and Wilkinson, Geoffrey, Advanced Inorganic Chemistry. (John Wiley & Sons, 1980) pp. 389-392.
Hopkins, "Acrylate Salts of Divalent Metals," *Industrial and Engineering Chemistry*, 47(11):2258-2265 (1955).
International Preliminary Examination Report for Application No. PCT/US98/09919, dated Oct. 19, 1998.

(Continued)

Primary Examiner — Vu A Nguyen
(74) Attorney, Agent, or Firm — Marshall, Gerstein & Borun LLP

(57) ABSTRACT

The disclosure relates generally to the use of low molecular weight polymers to aggregate mineral components in aqueous mineral slurries to release and separate individual components of the slurry, which may then be recovered from the slurry.

29 Claims, No Drawings

(56) References Cited

U.S. PATENT DOCUMENTS

| | | | |
|---|---|---|---|
| 4,676,439 A | 6/1987 | Saito et al. | |
| 4,753,710 A | 6/1988 | Langley et al. | |
| 4,787,561 A | 11/1988 | Kemp, Jr. et al. | |
| 4,795,531 A | 1/1989 | Sofia et al. | |
| 4,800,071 A * | 1/1989 | Kaesler et al. | 423/321.1 |
| 4,812,299 A | 3/1989 | Wason | |
| 4,844,355 A | 7/1989 | Kemp, Jr. et al. | |
| 4,845,192 A | 7/1989 | Sortwell et al. | |
| 4,892,590 A | 1/1990 | Gill et al. | |
| 4,902,382 A | 2/1990 | Sakabe et al. | |
| 4,913,361 A | 4/1990 | Reynolds | |
| 4,927,498 A | 5/1990 | Rushmere | |
| 4,954,220 A | 9/1990 | Rushmere | |
| 4,964,954 A | 10/1990 | Johansson | |
| 4,966,331 A | 10/1990 | Maier et al. | |
| 4,969,976 A | 11/1990 | Reed | |
| 4,980,025 A | 12/1990 | Andersson et al. | |
| 5,015,334 A | 5/1991 | Derrick | |
| 5,033,682 A | 7/1991 | Braun | |
| 5,065,946 A | 11/1991 | Nishida et al. | |
| 5,083,712 A | 1/1992 | Askew et al. | |
| 5,085,705 A | 2/1992 | Withiam | |
| 5,112,388 A | 5/1992 | Schulz et al. | |
| 5,147,449 A | 9/1992 | Grewe et al. | |
| 5,171,808 A | 12/1992 | Ryles et al. | |
| 5,176,891 A | 1/1993 | Rushmere | |
| 5,185,206 A | 2/1993 | Rushmere | |
| 5,221,435 A | 6/1993 | Smith, Jr. | |
| 5,236,989 A | 8/1993 | Brown et al. | |
| 5,240,561 A | 8/1993 | Kaliski | |
| 5,270,076 A | 12/1993 | Evers | |
| 5,312,595 A | 5/1994 | Moffett et al. | |
| 5,320,284 A | 6/1994 | Nishida et al. | |
| 5,320,773 A | 6/1994 | Perman et al. | |
| 5,338,712 A | 8/1994 | MacMillan et al. | |
| 5,350,437 A | 9/1994 | Watanabe et al. | |
| 5,374,335 A | 12/1994 | Lindgren et al. | |
| 5,393,436 A | 2/1995 | Nagan | |
| 5,470,435 A | 11/1995 | Rushmere et al. | |
| 5,473,033 A | 12/1995 | Kuo et al. | |
| 5,482,693 A | 1/1996 | Rushmere et al. | |
| 5,487,882 A | 1/1996 | Hu et al. | |
| 5,501,774 A | 3/1996 | Burke | |
| 5,503,820 A | 4/1996 | Moffett et al. | |
| 5,514,249 A | 5/1996 | Cauley et al. | |
| 5,543,014 A | 8/1996 | Rushmere et al. | |
| 5,560,829 A | 10/1996 | Adams et al. | |
| 5,584,966 A | 12/1996 | Moffett | |
| 5,591,256 A | 1/1997 | Freeman et al. | |
| 5,595,630 A | 1/1997 | Moffett | |
| 5,596,530 A | 1/1997 | Lin et al. | |
| 5,662,826 A | 9/1997 | Nilsson et al. | |
| 5,676,796 A | 10/1997 | Cutts | |
| 5,681,480 A | 10/1997 | Langley et al. | |
| 5,704,556 A | 1/1998 | McLaughlin | |
| 5,863,516 A | 1/1999 | Otterstedt et al. | |
| 5,882,625 A | 3/1999 | Mac Dougall et al. | |
| 5,900,116 A | 5/1999 | Nagan | |
| 5,919,882 A | 7/1999 | Ryles et al. | |
| 5,935,425 A | 8/1999 | Sortwell | |
| 5,968,316 A | 10/1999 | McLauglin et al. | |
| 6,183,600 B1 | 2/2001 | Nagan | |
| 6,190,561 B1 | 2/2001 | Nagan | |
| 6,265,477 B1 | 7/2001 | Hurlock | |
| 6,447,686 B1 | 9/2002 | Choi et al. | |
| 7,901,583 B2 | 3/2011 | McColl et al. | |
| 2002/0188040 A1 | 12/2002 | Chen et al. | |
| 2004/0110861 A1* | 6/2004 | Shorbu et al. | 522/178 |
| 2004/0154988 A1 | 8/2004 | Sheets | |
| 2005/0159319 A1 | 7/2005 | Eoff et al. | |
| 2006/0207946 A1 | 9/2006 | McColl et al. | |
| 2010/0098493 A1 | 4/2010 | McColl et al. | |

FOREIGN PATENT DOCUMENTS

| | | |
|---|---|---|
| CA | 2 130 587 A1 | 2/1996 |
| CA | 2 290 473 A1 | 11/1998 |
| CA | 2 370 484 A1 | 11/2000 |
| CA | 2 378 131 A1 | 3/2001 |
| CA | 2378850 A1 | 3/2001 |
| CA | 2 515 581 A1 | 7/2004 |
| CA | 2 535 702 A1 | 3/2005 |
| CA | 2 558 038 A1 | 10/2005 |
| CA | 2 558 092 A1 | 10/2005 |
| CA | 2 558 143 A1 | 10/2005 |
| CA | 2 595 723 A1 | 4/2007 |
| CA | 2 625 798 A1 | 5/2007 |
| CA | 2 658 780 A1 | 2/2008 |
| CA | 2 667 277 A1 | 9/2008 |
| CA | 2 667 281 A1 | 9/2008 |
| CA | 2 677 846 A1 | 9/2008 |
| CA | 2 679 356 A1 | 9/2008 |
| CA | 2 690 866 A1 | 12/2008 |
| CA | 2 704 741 A1 | 4/2009 |
| CA | 2703601 A1 | 4/2009 |
| CA | 2 665 350 A1 | 12/2009 |
| CA | 2 682 542 A1 | 4/2010 |
| CA | 2 684 155 A1 | 4/2010 |
| CA | 2 667 933 A1 | 7/2010 |
| CA | 2 666 025 A1 | 11/2010 |
| CA | 2 701 317 A1 | 3/2011 |
| EP | 0 551 061 A1 | 7/1993 |
| EP | 0 620 190 A1 | 10/1994 |
| JP | 5-5104658 A | 8/1980 |
| SU | 958 651 A1 | 9/1982 |
| SU | 1507443 A2 | 9/1989 |
| WO | WO-96/05139 A1 | 2/1996 |
| WO | WO-96/05146 A1 | 2/1996 |
| WO | WO-01/92167 A1 | 12/2001 |
| WO | WO-2004/049787 A2 | 6/2004 |
| WO | WO-2004/060819 A1 | 7/2004 |
| WO | WO-2006/133262 A2 | 12/2006 |
| WO | WO-2009/153424 A1 | 12/2009 |
| WO | WO-2010/088388 A1 | 8/2010 |
| WO | WO-2012/088291 A1 | 6/2012 |

OTHER PUBLICATIONS

International Preliminary Report on Patentability for Application No. PCT/US2010/022406, dated Aug. 2, 2011.

International Preliminary Report on Patentability for Application No. PCT/US2011/044437, dated Oct. 24, 2012.

International Search Report and Written Opinion for Application No. PCT/US2010/022406, dated May 6, 2010.

International Search Report and Written Opinion for Application No. PCT/US2011/044437, dated Jan. 30, 2012.

Junaid et al., "Natural Zeolite Catalyzed Cracking-Assisted Light Hydrocarbon Extraction of Bitumen from Athabasca Oilsands," *Applied Catalysis A*, 354(1-2):44-49 (2008).

Kirk-Othmer Encyclopedia of Chemical Technology. (1995 ed.), vol. 16, pp. 888-925.

Kuznicki et al., "Natural Zeolite Bitumen Cracking and Upgrading," *Microporous and Mesoporous Materials*, 105(3):268-272 (2007).

Lambe et al., "Altering Solil Properties with Chemicals," *Chemical and Engineering News*, 32(6): 488-492 (1954).

McGraw-Hill Encyclopedia of Chemistry. (McGraw-Hill Book Co., 1983) p. 618.

Meunier et al., "Soil-Water Relationships in Calcium Acrylate Stabilized Soil," *Industrial and Engineering Chemistry*, 47(11):2265-2269 (1955).

Moffett, Robert H., On-site production of a silica-based microparticulate retention and drainage aid. Tappi Journal, vol. 77, No. 12 (Dec. 1994), pp. 133-138.

Non-Transition Elements. (Date Unknown), pp. 472-474.

Podkuiko et al., "Synthesis and Flocculating Power of Calcium-Containing Polyacrylate," *Russian Journal of Applied Chemistry*, 77(4):685-687 (2004).

(56) References Cited

OTHER PUBLICATIONS

Pummer, von H., Selektive Fullstoffretention and optische Eigenschaften des Papiers. (1973) pp. 417-422.
Response to Canadian Office Action, filed Mar. 23, 2011.
Sneed, M. Cannon and Maynard, J. Lewis, General Inorganic Chemistry. (D. Van Norstrand Co., Inc., 1943) pp. 711-713.
Van Olphen, H, An Introduction to Clay Colloid Chemistry. (John Wiley & Sons, Date Unknown), pp. 57-68.
Raju et al., Synthesis of novel superabsorbing copolymers for agricultural and horticultural applications, Polym. Int., 50:946-51 (2001).
Gronowski et al., Copolymerization of styrene with magnesium, calcium, strontium, and barium acrylates in dimethyl sulfoxide, Makromol. Chem., 190:2063-9 (1989).
Examination Report issued in Canadian patent application No. 2,803,904 (Apr. 19, 2013).

* cited by examiner

METHOD FOR DISPERSING AND AGGREGATING COMPONENTS OF MINERAL SLURRIES AND LOW MOLECULAR WEIGHT MULTIVALENT POLYMERS FOR MINERAL AGGREGATION

CROSS-REFERENCE TO RELATED APPLICATION

The priority benefit of each of U.S. Provisional Patent Application No. 61/590,489 filed Jan. 25, 2012, and International Patent Application No. PCT/US13/22459 file Jan. 22, 2013, is hereby claimed and the entire respective disclosures thereof are incorporated herein by reference.

BACKGROUND OF THE INVENTION

1. Field of the Invention

The invention relates generally to polymers and the use thereof to assist in aggregating mineral components in aqueous mineral slurries to release and separate individual components of the slurry, which may then be recovered from the slurry.

2. Related Technology

Many industrial processes involve the dispersion of minerals in water to assist in the separation and recovery of mineral or other components. The mining industry is the predominant user of such processes, wherein mineral ores are ground and slurried in water to allow separation and recovery of desired components. The residual mineral components in the slurry, referred to as gangue or tailings, are then often deposited in pits or ponds, often called tailings ponds, where solids are expected to settle to allow recovery of the supernatant water, and ultimate consolidation of the remaining mineral solids. Coal, copper, and gold mining are but a few of the mining processes that employ this technology.

The slow rate of mineral solids settling in tailings ponds is often a serious economic and environmental problem in mining operations. If an objective of such processes is to recover water for reuse or disposal, lengthy pond residence times, often measured in years, can cripple process economics. Further, huge volumes of ponded slurry can be environmentally and physically dangerous. Dike failures of coal slurry ponds in the United States attest to both these dangers.

If the ponded slurry is predominantly composed of coarse minerals, the settling rate in tailings ponds is not generally an environmental or economic problem. In this instance, solids settle quickly and consolidate to disposable consistencies, and water is easily recovered. But when components of the ponded slurry are very fine materials, settling is often hindered and, in some instances, may take years to occur.

A major undesired component of many mineral slurries is often clay. Clays have a variety of chemical compositions but a key difference in how a clay behaves in a mineral slurry is whether it is predominantly in a monovalent (usually sodium) form or in a multivalent (usually calcium) form. The effects of the varying chemical compositions of clays are well known to those in industry. Monovalent clays tend to be water-swelling and dispersive, multivalent clays generally are not.

Water-swelling and dispersive clays cause many of the problems in mineral processing and tailings dewatering. These clays tend to be monovalent, sodium clays, such as bentonite, which is largely composed of montmorillonite. These clays can be expressed as $Na.Al_2SO_3.4SiO_2.H_2O$.

Further, if the clays are very finely divided, the problem is often magnified. If the clay particles are easily broken down to even finer particles through shearing in processing, problems can be compounded. Layered, platelet, or shale-like forms of clay are particularly sensitive to mechanical breakdown to even finer particles during processing.

In mineral processing, additives are often used to facilitate removal of specific components. Frothers used to separate and float ground coal particles are an example of this. In this instance, the desired component to be recovered is an organic material such as coal, but similar processes are used for mineral recoveries. In almost all mining processes the remaining slurry must be separated to recover water and consolidated solids.

Since the late 1960s, a new mining industry has been operating in the northeast of the Canadian province of Alberta. The deposits being mined are referred to as the Athabaska oil sands. The deposits are formed from a heavy hydrocarbon oil (called bitumen), sand, clay, and water. In processing the deposit, the ore is slurried in warm or hot water with the objective of separating the bitumen from the sand and clay, recovering the bitumen by flotation, recovering the water for reuse, and disposing of the dewatered residual mineral solids in site reclamation. The oil sand deposits contain the second largest quantity of oil in the world, second only to Saudi Arabia's. Consequently, separation, water recovery, and solids disposal are carried out on an industrial scale never before seen.

The first objective in oil sands processing is to maximize bitumen recovery. Slurrying in warm or hot water tends to release bitumen from the minerals in the ore, in a pipeline process called hydro-transport, while the slurry is transported via pipeline to a primary separation unit. Various chemical additives, including caustic soda or sodium citrate, have been used to improve dispersion of the ore's components into the process water and to accelerate separation of the bitumen from the sand and clay for greater bitumen recovery. In the hydro-transport process, sand is relatively easily stripped of bitumen and readily drops out and is removed through the bottom of the primary separation unit; the clays are the principal problem. Clays, associated with divalent or other multivalent cations, particularly calcium and magnesium, contributed by, for example, process waters are recognized to deter efficient separation and flotation of the bitumen. The use of additives such as caustic soda or sodium citrate aid in the dispersion to inhibit clay's deleterious effects. Sodium citrate is a known dispersant and also acts as a water-softening agent, to sequester calcium and magnesium ions.

While improving recovery, these additives often have residual negative effects following bitumen separation by inhibiting subsequent water removal from the clay. A great deal of research has gone into studying the various types of clays found in the oil sands deposits. Different clays affect bitumen separation differently, often in ways not completely understood, and differences in the clays affect the clays' subsequent separation from the process water. Since ore is a natural deposit, the separation process is at the mercy of clay type and content, and the level of divalent ions. Pump and pipeline shear acting on the slurry break down clay into finer clay particles to further negatively affect the separation process. Various ore sources are often blended prior to hydro-transport in an attempt to mitigate the effects of clays. Compressed air may be introduced into the hydro-transport pipeline. The air dissolves under pressure and, as pressure is released ahead of the primary separation vessel, bubbles form to help float the bitumen.

In the separation process, the floated bitumen overflows to further processing. Typically, the sand and any coarse clays settle quickly into the base of a conical primary separation unit. The withdrawal rate of this coarse segment can be controlled. The largest volumetric component, called middlings, is the middle stratum above the coarse layer and below the bitumen float. The middlings comprise a dispersion of the fine clays. The industry considers these fine clays to be any size less than 44 microns in diameter. These clays usually form a very stable dispersion. Any dispersive additives further increase the stability of the clay slurry. If the dispersant, or any other additive, increases middlings viscosity in the primary separation unit, then bitumen flotation and recovery may be hindered.

In existing processes, the conditions that promote efficient dispersion and bitumen recovery appear to be diametrically opposed to the conditions that subsequently promote downstream fine clay separation, solids consolidation, and water recovery. The longer it takes to recover and reuse the process water, the more heat and evaporative losses occur. The tradeoff between efficient bitumen extraction and downstream disposal of mineral solids is an expensive problem for the oil sands industry.

In the extraction process, middlings are continuously withdrawn from the center of the primary separation unit. Both the heavy, easily settled sand/coarse clay component, withdrawn from the conical bottom of the primary separation unit, and the middlings component are usually subjected to additional cleaning and mechanical dewatering steps to recover any bitumen that is not floated off in the primary separation unit. The middlings may be hydrocycloned to increase density. The middlings then generally report to a thickener, where high molecular weight sodium/potassium/ammonium-acrylate/acrylamide-based copolymers (called flocculants) are added to coagulate and flocculate the dispersed middlings' fine clays. Four to five hours of residence time are generally required in the thickener to produce a thickened underflow (to begin to increase clay solids for use in final solids consolidation) and to produce clarified overflow water for reuse in the process. Thickeners are immense, expensive mechanical separators with massive holding volumes.

The final objective of the oil sands process is to produce dense, trafficable solids for site reclamation and to recover water for process use. The two mineral process streams, sand/coarse clay from the primary separation unit, and middlings (often thickened as described above) are either pumped to separate containment areas (called ponds) or are combined and then sent to ponds. Both approaches have created problems, with which the industry is grappling. The combined streams (called combined tailings, or CT) have produced a condition wherein the coarse sand and clays have settled relatively quickly in the ponds, but the fine clays have not. Instead of the desired settling and recovery of supernatant water, the upper layer in these ponds forms an almost permanent layer of suspended fine clays, referred to as mature fine tails (MFT). The clay content in this relatively fluid, almost permanent layer of MFT generally ranges from 40 wt % to 50 wt % solids. When the middlings are pumped separately to ponds, the same condition is immediately created. The existence and size of these ponds threaten the very future of the industry. Government has ordered that these ponds of MFT must be re-processed, water recovered for reuse, and dewatered solids consolidated to restore the mined sites.

The oil sands industry has made a concerted effort to reprocess the MFT into what are called non-segregating tailings (NST). By this is meant sand and clay tailings of varying particle sizes that, when pumped to ponds, do not segregate by particle size upon settling but, rather, settle in a non-segregating manner, more quickly releasing supernatant and/or underflow drainage waters, and ultimately producing a trafficable solid that can be used for mine site restoration. Heat is still lost after the NST slurry is pumped to ponds and the warm water still evaporates. Any method or procedure that could recover more warm water within the operating process, and that could produce easily-dewatered, non-segregating tailings immediately after the separation process, would be of great benefit to the oil sands industry.

In Nagan U.S. Pat. No. 6,190,561 and its counterpart Canadian Patent No. 2,290,473, the entire respective disclosures of which are incorporated herein by reference, Nagan describes a process using "zeolite crystalloid coagulants (ZCC)" as a method of water clarification. This sodium or potassium zeolite, referred to in the patent as ZCC, is used in a specific sequence to coagulate solid particles and separate them from an aqueous dispersion. The specified sequence comprises, first, providing an aqueous suspension of particulate matter containing (and maintaining) multivalent cations (and optionally adding additional multivalent cations, such as cationic polyacrylamide), then adding a zeolite crystalloid coagulant in sufficient amount to effect coagulation of the particulate matter by ion exchange between said adsorbed cations and the sodium or potassium present in the ZCC. This specific sequence is very effective in coagulating the cationic solids.

In the '561 and '473 patents, Nagan describes the procedure for producing this type A zeolite by reacting sodium aluminate and either sodium or potassium silicate, relatively inexpensive and commercially available chemicals. Both sodium silicate and sodium aluminate are available as bulk liquids.

SUMMARY OF THE INVENTION

The invention is directed to overcoming at least one of the problems associated with the separation of components within an aqueous mineral slurry, the recovery of specific components from the slurry, and subsequent dewatering and disposal of the residual mineral slurry.

Accordingly, the invention provides a method and water-soluble polymer for treatment of aqueous dispersions of components of a solid mineral-containing slurry, particularly wherein one or more clay and/or the chemical components of clay(s), or other minerals, inhibit (a) initial dispersion and separation of the mineral components and any organic components and/or (b) following separation of the desired components, the clay(s) (or other minerals) form stable suspensions that resist dewatering.

The invention is particularly applicable for use with slurries containing swellable sodium clays such as bentonite/montmorillonite clays, such as those expressed as $Na.Al_2SO_3.4SiO_2.H_2O$.

According to the invention, a useful polymer is a water-soluble, multivalent, cation-containing acrylate copolymer with a monomer such as acrylamide. The copolymer may be a terpolymer containing a multivalent, cation-containing acrylate with a monomer such as acrylamide and a third monomer such as AMPS (2-acrylamido-2-methylpropane sulfonic acid). The polymer is produced and added in water solution to a mineral-containing slurry to cause the solid mineral components to immediately begin to aggregate and settle to form a product comprising a solid aggregated floc and supernatant water, thereby enhancing separation and subsequent recovery of solid mineral components of the mineral slurry and enhancing subsequent water removal and consolidation of residual components of the product. As used herein, the term "copolymer" denotes polymers including two or more different monomer units, and therefore is inclusive of terpolymers, for example.

Preferably, the multivalent acrylate copolymer is manufactured using solution polymerization, gel polymerization, dispersion polymerization, or emulsion polymerization, and preferably is either in the form of a solution, gel, or dry-granular solid manufactured via solution polymerization, a dry polymer produced from dispersion polymerization, or in the form of an invert emulsion, wherein the polymerization takes place in the emulsion. In all instances the polymers are essentially water soluble, the polymer molecules being linear or deliberately lightly cross-linked.

The intrinsic viscosity of the polymer is less than 5 dl/gm (measured in 1 M NaCl at 25 degrees C.) and flocculates fine clays, or co-flocculates fine clays and course minerals in a slurry. Preferably, the intrinsic viscosity of the polymer is at least 3 dl/gm (measured in 1 M NaCl at 25 degrees C.).

Throughout this description, intrinsic viscosity is to be understood as being expressed in terms of dl/gm, as measured in 1 M NaCl at 25 degrees C. Also, all percentages are understood to be wt. % unless otherwise indicated.

In one embodiment of the invention, a zeolite, preferably in an aqueous solution or dispersion, is added to the aqueous mineral slurry. The multivalent acrylate copolymer is then added in water solution in sufficient amount to react with the zeolite to immediately neutralize the dispersive effect of the zeolite to cause the mineral and other solid components to aggregate and settle.

In Nagan '561 and '473, when an inorganic divalent ion is added after ZCC to a slurry of course and fine solids, the coarse solids settled first, followed by the aggregated fines. When the low intrinsic viscosity divalent acrylate copolymer is added to a slurry of course and fine solids, the solids in the slurry co-aggregate. In the case of a slurry of oil sands fines and sand, the solids co-aggregate to form non-segregating, rapidly-draining solids (NST). If the ZCC is added to an oil sands ore slurry ahead of extraction, for example into the hydro-transport water, and the low intrinsic viscosity divalent acrylate copolymer is added to the final dilution water ahead of a simulated primary separation vessel (PSV), the bitumen floats without hindrance and the fines and sand co-aggregate and settle as non-segregated tailings (NST). This co-aggregation could significantly improve and simplify the handling of mineral solids after extraction in the oil sands process.

In industrial applications of conventional monovalent acrylate polymers or copolymers in the flocculation of mineral solids in aqueous slurries, the molecular weight of the polymer plays an important part in complementing the hydrogen bonding and Van der Wahls' forces in producing a stable, draining floc. Generally medium to high molecular weights (e.g., intrinsic viscosities of 12 dl/gm and above) are necessary to produce a floc that maintains its cohesiveness under shear. With lower intrinsic viscosity conventional monovalent acrylate copolymers, first the dosage required will need to be increased to maintain floc structure, then, at even lower intrinsic viscosities such as around 8 dl/gm or less, the floc structure, in a treated aqueous clay slurry, starts to form but collapses under the shear applied by the mixing of the flocculant solution into the slurry. The slurry reverts to its dispersed condition.

Water solutions of medium-to-high molecular weight water-soluble multivalent acrylate copolymers, such as calcium diacrylate/acrylamide copolymers, flocculate/aggregate aqueous clay slurries very efficiently, producing free-draining, shear-resistant aggregates. It had been assumed that a medium-to-high molecular weight was necessary to complement the calcium bonding reaction with the clay to form stable, free draining aggregate.

Molecular weight in a calcium diacrylate copolymer is not the prime determinant in producing a shear-resistant, free-draining aggregate. Whereas monovalent acrylate polymers and copolymers are dependent on a moderate-to-high molecular weight to build the floc structure, relying on the relatively weak hydrogen bonding and Van der Wahls' forces acting in combination with molecular weight, it has been found that the divalent acrylate polymers form strong aggregating bonds in clay slurries at molecular weights far below conventional expectations. Intrinsic viscosities of less than 5 dl/gm form strong, shear-resistant, fast draining structures.

Other objects and advantages of the invention will be apparent to those skilled in the art from a review of the following detailed description, taken in conjunction with the appended claims.

DETAILED DESCRIPTION

Accordingly, the invention provides a method to enhance dewatering of the solids in a mineral slurry for water recovery and solids reclamation, the method comprising:

(a) providing an aqueous slurry comprising slurrying water, solid mineral components and possibly organic components such as bitumen;

(b) optionally adding to the slurry of (a) a sodium or potassium zeolite having a weight ratio of aluminum to silicon in the range of about 0.72:1 to about 1.3:1 in an amount sufficient to disperse and separate the components of the slurry to form a dispersed slurry;

(c1) adding to the dispersed slurry of (a) sufficient quantities of a water solution of a polymer reactive with said solid mineral components, said polymer being selected from the group consisting of water-soluble multivalent cation-containing acrylate copolymers, said polymers having an intrinsic viscosity of less than 5 dl/gm (measured in 1 M NaCl at 25 degrees C.), to cause the polymer to react with the solid mineral components to cause the solid mineral components to immediately begin to floc and settle to form a product comprising a floc and supernatant water, thereby enhancing separation and subsequent recovery of solid mineral components of the slurry and enhancing subsequent water removal and consolidation of residual components of the product; or (c2) adding to the dispersed slurry of (b) sufficient quantities of a water solution of a polymer reactive with said mineral components, said polymer being selected from the group consisting of water-soluble multivalent cation-containing acrylate copolymers, said polymers having an intrinsic viscosity of less than 5 dl/gm (measured in 1 M NaCl at 25 degrees C.), to cause the polymer to react with the zeolite and solid mineral components to immediately neutralize the dispersive effect of the zeolite in (b) to cause the solid mineral components to immediately begin to aggregate and settle to form an aggregate and supernatant water, thereby enhancing separation and subsequent recovery of solid mineral components of the slurry and enhancing subsequent water removal and consolidation of residual components of the product.

The solid mineral component may be a clay. Preferably, the clay is a water-swelling, sodium clay such as bentonite/montmorillonite, such as those expressed as $Na.Al_2SO_3.4SiO_2.H_2O$.

Preferably, the multivalent cations of the acrylate monomer are selected from the group consisting of calcium, magnesium, iron, and aluminum.

The polymer preferably is a calcium or magnesium-containing copolymer of the divalent acrylate with acrylamide, or a terpolymer of the divalent acrylate, acrylamide, and AMPS (2-acrylamido-2-methylpropane sulfonic acid).

The multivalent acrylate copolymer preferably is either in the form of a solution, gel or dry granular solid, manufactured via solution polymerization, a dry polymer produced by dispersion polymerization, or in the form of an invert emulsion, wherein the polymerization takes place in the emulsion. In all instances the polymers are essentially water soluble, the polymer molecules being linear or only lightly cross-linked.

The molecular weight of the polymer is low, having an intrinsic viscosity of less than 5 dl/gm, preferably at least 3 dl/gm.

A solution of the water-soluble polymer is used at a dosage sufficient to flocculate/aggregate the mineral components and any organic components. An effective dosage range of the aggregant preferably is between 100 grams and 2000 grams (and preferably 1000 grams or less) of polymer/ton of clay fines.

In a preferred embodiment, separation and subsequent recovery of solid mineral components of the slurry, subsequent water removal, and consolidation of residual components of the slurry may be enhanced by the addition of sand to a fine clay slurry. In the case of a mixture of oil sands fine clay and sand treated with the polymer of this invention, the free-draining deposited solids are non-segregating, the preferred form of tailings deposit.

In one preferred embodiment, the water-soluble polymer is a calcium diacrylate/acrylamide copolymer or a calcium diacrylate/acrylamide/2-acrylamido-2-methylpropane sulfonic acid (AMPS) terpolymer having an intrinsic viscosity of less than 5 dl/gm, highly preferably with a calcium diacrylate content of at least 5 mole %. In one form of this embodiment, performance can be enhanced by applying controlled mechanical shear to a solution of the polymer sufficient to reduce the breadth of the molecular weight distribution and/or to reduce the solution viscosity to provide a polymer solution that more easily mixes with viscous or dense substrates to enhance performance of the polymer.

Preferably, the aqueous polymer solution is substantially free of monovalent cation-containing acrylate polymers, and highly preferably only a single species of multivalent cation selected from the group consisting of calcium, magnesium, iron, and aluminum is present in the polymer solution.

Each of the substantial absence of monovalent cations and the presence of only a single species of multivalent cation contributes to high specificity of the polymer for the mineral components of the slurry, particularly in the case of clays.

The low molecular weight anionic moiety of the water-soluble polymer of the invention may be a copolymer of a multivalent salt of an organic acid (such as calcium, magnesium, iron, or aluminum acrylates) with acrylamide, or even a terpolymer of these organic monomers with a monomer such as 2-acrylamido-2-methylpropane sulfonic acid (AMPS). The common denominator of these polymeric aggregants is that they contain multivalent acrylic salts and that the polymers produced are essentially linear in nature.

The linear nature of a polymer, such as described above, may be modified by very slight cross-linking to produce a degree of two-dimensionality in the polymer. This slight cross-linking to a two-dimensional structure is referred to as "branching."

On the anionic copolymers of multivalent acrylates of the invention, branching may be induced by the addition of any suitable additional cross-linker monomer, such as methylene-bis-acrylamide (MBA). MBA is essentially two acrylamide molecules non-linearly bridged by a methyl group. The level of cross-linking monomer that is required to achieve branching is low, typically in the range of 0.1 ppm to 5 ppm, based on total monomer(s).

If desired, mechanical shear may be applied to a solution of the polymer sufficient to reduce the molecular weight of the polymer or the breadth of the molecular weight distribution of the polymer.

The low solution viscosities of the polymer of this invention are particularly advantageous when the mineral stream to be treated is either very dense or very viscous, or both. The lower the solution viscosity of the polymer, the more thoroughly the polymer molecules can contact the individual mineral solids. If less mixing energy is required to achieve this particle contact, there is less energy applied that can simultaneously shear the polymeric structure being produced. Instantaneous mixing of the polymer solution with the mineral particles is desirable to minimize aggregate destruction.

Slight branching of the calcium diacrylate copolymer (or other multivalent cation-containing acrylate polymer) of the invention tends to further improvement of the performance of the linear diacrylate polymer in aggregating mineral fines, releasing cleaner water. The aggregated structure formed with the slightly branched calcium diacrylate polymer produces a more robust, shear-resistant solid.

In some embodiments, the slurry of (a) contains organic materials, and/or the solid mineral components comprise particles 44 microns or less in size.

In some embodiments, the solid components comprise a mineral ore and the slurry may contain bitumen, and in oil sands applications the slurry typically contains sand, clay, residual bitumen, and water.

EXAMPLES

Performance of Monovalent Acrylate Polymers

A high molecular weight (IV18), branched sodium acrylate/acrylamide copolymer was applied in a 0.4% solution to a slurry of oil sands fine clay tailings (<44 microns clays in mature fine tails—MFT) at 900 g/ton of clay. A floc structure was formed. A series of analogous polymers, with ever decreasing molecular weights (intrinsic viscosities) were produced and applied at the same dosage. The last in the series had an intrinsic viscosity of 6.3 dl/gm (measured in 1 M NaCl at 25 degrees C.). The IV 6.3 polymer began to form a floc but the floc immediately disintegrated and the slurry returned to its homogenous consistency. This is typical of insufficient molecular weight and is a reason why medium to high molecular weights of monovalent acrylates are required to function as flocculants. Varying the dosage of this IV 6.3 polymer did not produce a floc structure.

Preparation of a Low Molecular Weight Linear Gel Polymer

The preparation of a low molecular weight polymer and an operating solution thereof are further described and illustrated by the following example, which is not intended to be limiting.

A 20% linear solution polymer (65 wt. % calcium diacrylate) was prepared from the following reagents:

| Reagent | Weight % |
| --- | --- |
| Calcium diacrylate | 13.0 |
| Acrylamide | 7.0 |
| Demineralized water | 79.99 |
| 2,2'-Azobis [2-(imidazolin-2-yl)propane]dihydrochloride | 0.0018 |
| t-butyl Hydroperoxide | 0.0063 |
| Sodium bisulfite | 0.0023 |

A rapid reaction produced a gel. The intrinsic viscosity (IV) of this polymer was 4.5 dl/gm (measured in 1 M NaCl at 25 degrees C.). A 0.4% polymer solids solution was produced from the gel. This solution, and an analogous solution of a slightly branched 60 wt. % calcium diacrylate/40 wt. % acrylamide copolymer (IV 4.9) were tested against a slightly-branched high molecular weight 60 wt. % calcium diacrylate/40 wt. % acrylamide copolymer (IV 16.5 dl/gm) on oil sands 32% solids mature fine tailings (MFT). Both of the low intrinsic viscosity polymers matched the flocculating/aggregating performance of the IV 16.5 polymer, with both low IV polymers giving superior deposit drainage.

The IV 4.5 solution from above, and a solution of a slightly branched 60 wt. % calcium diacrylate/40 wt. % acrylamide copolymer (IV 4.9), were tested against a slightly branched high molecular weight 60 wt. % calcium diacrylate/40 wt. acrylamide copolymer (IV 16.5 dl/gm) on oil sands 32% solids mature fine tailings (MFT). Both of the low intrinsic viscosity polymers and the IV16.5 polymer produced aggregate but both low IV polymers gave superior drainage. The branched low IV diacrylate polymer appeared to produce a stiffer deposit than the linear low IV diacrylate polymer.

Aggregating and Dewatering by Centrifugation

One method of dewatering mature fine tailings (MFT) (<44 micron clays in 20% to 40% suspensions) is to treat with flocculant and centrifuge to produce a soft solid called "cake." The cake can then be left to dry or be mixed with sand to produce a trafficable solid. Feed of MFT to the centrifuge has been conventionally treated with a solution of monovalent anionic flocculant, such as a copolymer of sodium acrylate/acrylamide. However, the clay solids in this dewatered cake are still the same <44 micron fines as before treatment. This can be easily seen by simply re-dispersing some of the "cake" in water, where it forms a non-settling, uniform dispersion of the <44 micron particles. The fact that the fines are unchanged means that they can present problems in producing the ultimately desirable trafficable solids necessary for site reclamation.

In a comparative centrifuge test, the same <44 micron MFT was treated with 900 grams/ton of the IV16.5 and the IV 4.5 calcium diacrylate copolymers described above. Over a series of centrifuge time studies comparing the two calcium diacrylate copolymers, the deposition rate with the IV 4.5 calcium diacrylate copolymer was more than twice as fast as the deposition rate obtained with the higher IV acrylate polymer, and the IV 4.5 diacrylate polymer produced cleaner water, and a gritty, drier deposit.

Mineral Solids Co-Aggregation from Oil Sands in Bitumen Extraction

In Sortwell Canadian Patent 2,667,933, a process is described where oil sands slurrying water is treated with nanoparticle sodium zeolite to disperse and separate bitumen from the sand/clay mineral solids ahead of flotation separation. The final dilution water ahead of bitumen flotation is treated with inorganic calcium from calcium chloride. As bitumen flotation occurs, the sand settles rapidly and the clay particles, their dispersive properties neutralized by the reaction of inorganic calcium ions on the clay and zeolite, coalesce and settle. The sand and clay settle in two distinct layers.

Test #12 parameters in the Examples in Sortwell '933 were repeated using 360 g of zeolite active (per ton of ore) but the calcium chloride in the final dilution water before the extraction step was replaced by 800 g of the IV 4.5 calcium diacrylate polymer (per ton of ore). The final dilution water was divided in half, with 10 seconds mixing after each half was added to the ore slurry, the polymer being added in the second divided half. After the final 10 second mix, the bitumen floated free and the clean sand and clay aggregated as one non-segregated deposit.

Molecular Weight Reduction by Mechanical Shear

A 1% solution of an IV 7.3, 65 wt. % calcium diacrylate copolymer was briefly sheared (about 10 seconds) in a laboratory rotor/stator device. The IV was reduced to 4.5. The solution was further diluted to 0.4%, tested on 32% MFT, and found to produce a strong, free-draining aggregate.

CONCLUSION

It is well-known in industry in general, and in the oil sands industry in particular, that divalent ions have an affinity for clays, particularly water-swelling sodium clays. The most commonly used flocculants in clay systems in mining, particularly in oil sands mining operations, are high molecular weight sodium (monovalent) polyacrylate copolymers (see the multiple references to anionic sodium polyacrylates in CA 2,515,581, for example) that do not have a chemical affinity for sodium clays. Calcium (divalent) diacrylates as a component of a medium-to-high molecular weight anionic polymer have shown superior aggregating and dewatering performance compared to medium-to-high molecular weight monovalent (sodium) acrylate polymers in mineral slurries. The discovery that low molecular weight calcium diacrylate polymers also produce stable, free-draining aggregates further improves the polymers' applicability in the treatment of mineral solids and is a significant advance in the science of synthetic flocculants.

The foregoing detailed description is given for clearness of understanding only, and no unnecessary limitations should be understood therefrom, as modifications within the scope of the invention may become apparent to those skilled in the art

The invention claimed is:

1. A method of treating an aqueous mineral slurry to disperse and separate the components of the slurry, to enhance recovery of components of the slurry, and to enhance dewatering of the solids in the resulting residual slurry for water recovery and solids reclamation, said method comprising:
   (a) providing an aqueous slurry comprising slurrying water and solid mineral components;
   (b) optionally adding to the slurry of (a) a sodium or potassium zeolite having a weight ratio of aluminum to silicon in the range of about 0.72:1 to about 1.3:1 in an amount sufficient to disperse and separate the components of the slurry to form a dispersed slurry;
   (c1) adding to the dispersed slurry of (a) sufficient quantities of a water solution of a polymer reactive with said solid mineral components, said polymer being selected from the group consisting of water-soluble multivalent cation-containing acrylate copolymers, said polymers having an intrinsic viscosity of less than 5 dl/gm (measured in 1 M NaCl at 25 degrees C.), to cause the polymer to react with the solid mineral components to cause the solid mineral components to immediately begin to floc and settle to form a product comprising a floc and supernatant water, thereby enhancing separation and subsequent recovery of solid mineral components of the slurry and enhancing subsequent water removal and consolidation of residual components of the product; or
   (c2) adding to the dispersed slurry of (b) sufficient quantities of a water solution of a polymer reactive with said mineral components, said polymer being selected from the group consisting of water-soluble multivalent cation-containing acrylate copolymers, said polymers having an intrinsic viscosity of less than 5 dl/gm (measured in 1 M NaCl at 25 degrees C.), to cause the polymer to react with the zeolite and solid mineral components to immediately neutralize the dispersive effect of the zeolite in (b) to cause the solid mineral components to immediately begin to aggregate and settle to form an aggregate and supernatant water, thereby enhancing separation and subsequent recovery of solid mineral components of the slurry and enhancing subsequent water removal and consolidation of residual components of the product.

2. The method of claim 1 wherein the intrinsic viscosity of the polymer is at least 3 dl/gm (measured in 1 M NaCl at 25 degrees C.).

3. The method of claim 1 wherein the polymer solution is substantially free of monovalent cation-containing acrylate polymers.

4. The method of claim 1 wherein the multivalent cations are selected from the group consisting of calcium, magnesium, iron, and aluminum.

5. The method of claim 1 wherein only a single species of multivalent cation is present in the polymer solution.

6. The method of claim 1 wherein the polymer is a calcium- or magnesium-containing diacrylate copolymer with acrylamide.

7. The method of claim 6 wherein the polymer is a diacrylate/acrylamide/2-acrylamido-2-methylpropane sulfonic acid (AMPS) terpolymer.

8. The method of claim 1 wherein the slurry of mineral components comprises fine components less than 44 microns in size alone or in combination with coarser components.

9. The method of any of claim 1 wherein said polymer is a calcium diacrylate/acrylamide copolymer, or a calcium diacrylate/acrylamide/2-acrylamido-2-methylpropane sulfonic acid (AMPS) terpolymer.

10. The method of claim 9 wherein said polymer has a calcium diacrylate content of at least 5 mole %.

11. The method of claim 1 comprising applying mechanical shear to a solution of the polymer sufficient to reduce the molecular weight of the polymer or the breadth of the molecular weight distribution of the polymer.

12. The method of claim 1 wherein said slurry of (a) contains clay.

13. The method of claim 12 wherein the clay is a swellable, sodium clay.

14. The method of claim 13 wherein the clay is a bentonite/montmorillonite clay.

15. The method of claim 14 wherein the clay is expressed as $Na.Al_2SO_3.4SiO_2.H_2O$.

16. The method of claim 1 wherein the polymer is a calcium- or magnesium-containing diacrylate copolymer.

17. The method of claim 1 wherein the polymer is a diacrylate/acrylamide copolymer.

18. The method of claim 1 wherein the polymer is a diacrylate/acrylamide/2-acrylamido-2-methylpropane sulfonic acid (AMPS) terpolymer.

19. The method of claim 1 wherein said slurry of (a) contains organic materials.

20. The method of claim 1 wherein said solid components comprise a mineral ore.

21. The method of claim 1 wherein said slurry contains bitumen.

22. The method of claim 1 wherein said slurry contains sand, clay, bitumen, and water.

23. The method of claim 22 wherein the clay is a swellable, sodium clay.

24. The method of claim 23 wherein the clay is a bentonite/montmorillonite clay.

25. The method of claim 24 wherein the clay is expressed as $Na.Al_2SO_3.4SiO_2.H2O$.

26. The method of claim 1 wherein the polymer is branched.

27. The method of claim 26 wherein the branched polymer is prepared by reacting monomers comprising a source of multivalent cations, a source of acrylate, a monomer selected from the group consisting of acrylamide and 2-acrylamido-2-methylpropane sulfonic acid (AMPS), and a cross-linking agent.

28. The method of claim 27 wherein the cross-linking agent is present in an amount in the range of 0.1 ppm to 5 ppm based on the total weight of said monomers.

29. The method of claim 1, comprising centrifuging said slurry to separate the components of the slurry into supernatant water and solid particles.

* * * * *

UNITED STATES PATENT AND TRADEMARK OFFICE
CERTIFICATE OF CORRECTION

PATENT NO. : 8,721,896 B2  
APPLICATION NO. : 13/748486  
DATED : May 13, 2014  
INVENTOR(S) : Edwin T. Sortwell Page 1 of 1

It is certified that error appears in the above-identified patent and that said Letters Patent is hereby corrected as shown below:

Claims

Column 10, line 48 (claim 1) please omit the word "dispersed" and replace with "aqueous"

Signed and Sealed this  
Eighth Day of March, 2016

Michelle K. Lee  
*Director of the United States Patent and Trademark Office*